United States Patent [19]
Lillis et al.

[11] Patent Number: 5,534,792
[45] Date of Patent: Jul. 9, 1996

[54] LOW CAPACITANCE ELECTRONICALLY CONTROLLED ACTIVE BUS TERMINATOR CIRCUIT AND METHOD

[75] Inventors: William J. Lillis; Justin A. McEldowney, both of Tucson, Ariz.

[73] Assignee: Burr-Brown Corporation, Tucson, Ariz.

[21] Appl. No.: 388,719

[22] Filed: Feb. 15, 1995

[51] Int. Cl.⁶ .................... H03K 17/16; H03K 19/003
[52] U.S. Cl. .............................. 326/30; 327/321
[58] Field of Search .................. 326/90, 86, 30; 327/108, 109, 315, 318, 321, 322, 327, 330; 333/32, 22 R, 12, 17.3; 375/257

[56] References Cited

U.S. PATENT DOCUMENTS

| | | | |
|---|---|---|---|
| 4,748,426 | 5/1988 | Stewart | 333/22 |
| 4,831,283 | 5/1989 | Newton | 326/30 |
| 4,920,339 | 4/1990 | Friend et al. | 340/825 |
| 5,166,957 | 11/1992 | Lenoir | 326/30 |
| 5,272,396 | 12/1993 | Mammano et al. | 307/443 |
| 5,336,948 | 8/1994 | Jordan | 307/443 |
| 5,338,979 | 8/1994 | Mammano et al. | 307/443 |
| 5,381,034 | 1/1995 | Thrower et al. | 257/529 |
| 5,382,841 | 1/1995 | Feldbaumer | 326/30 |

OTHER PUBLICATIONS

"Push SCSI Performance to the Limit", by Paul Boulay et al., Electronic Design, May 10, 1990, pp. 85–92.

*Primary Examiner*—Edward P. Westin
*Assistant Examiner*—Richard Roseen
*Attorney, Agent, or Firm*—Cahill, Sutton & Thomas

[57] ABSTRACT

An electronically controllable low capacitance active bus line terminator achieves low output terminal capacitances by connecting emitters of switch transistors directly to the output terminals. Termination resistors are connected directly between an output of a voltage regulator circuit and collectors of the switch transistors. Emitters of optional clamp transistors can be connected to bases or collectors of the switch transistors to limit or prevent "ringing" of bus conductors connected to the output terminals if the switch transistors are turned on. The bus conductors are thereby isolated from parasitic capacitances associated with the termination resistors and the collectors of the switch transistors when they are turned off.

13 Claims, 3 Drawing Sheets

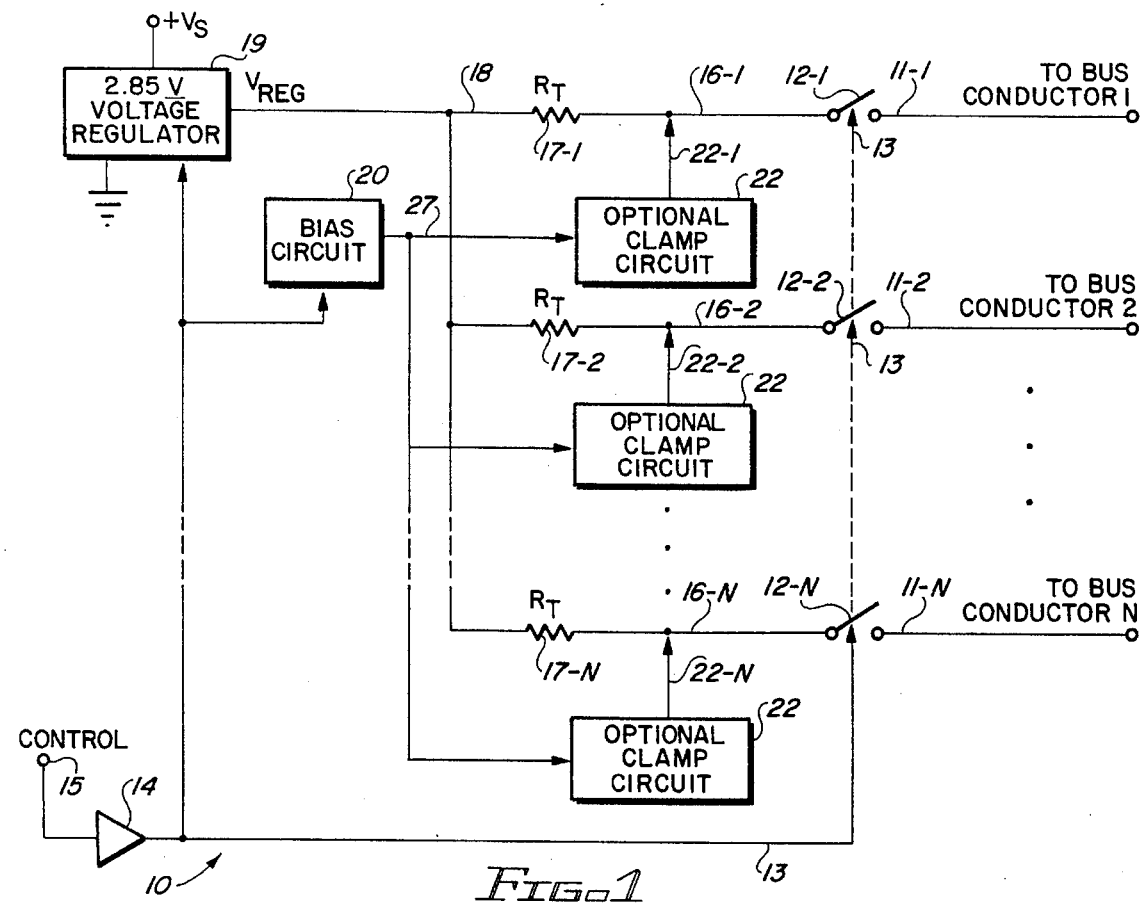
FIG. 1
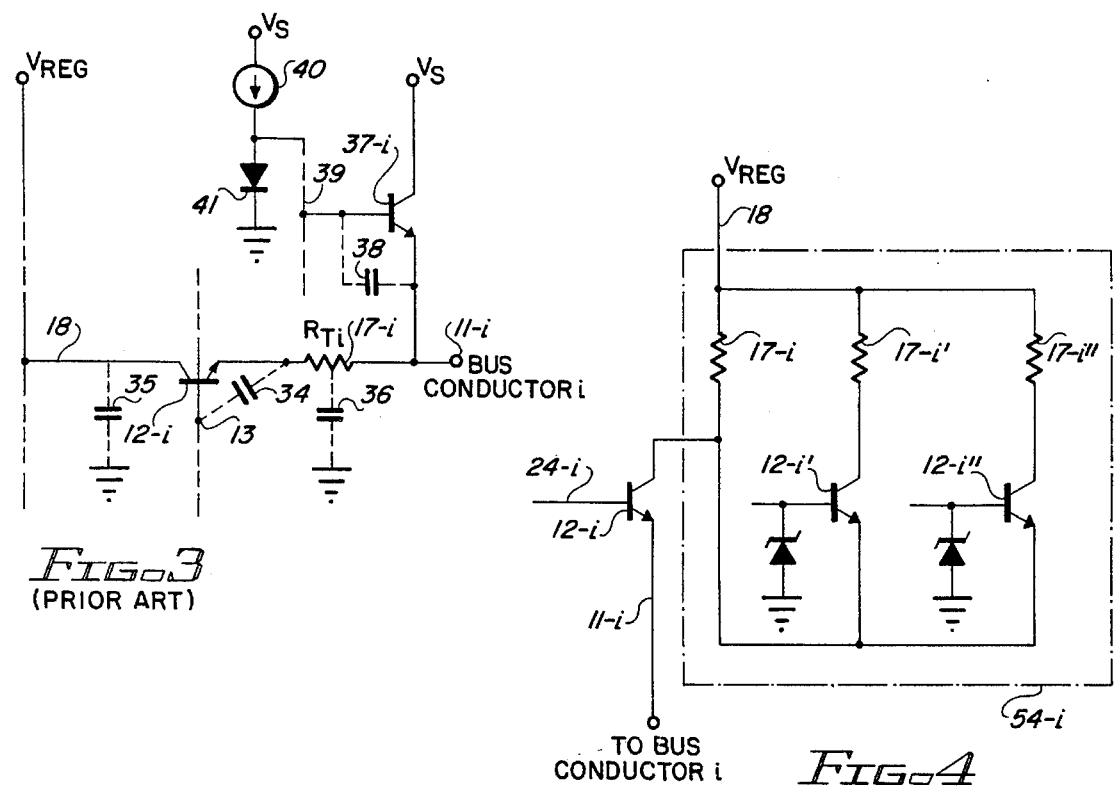
FIG. 3 (PRIOR ART)
FIG. 4

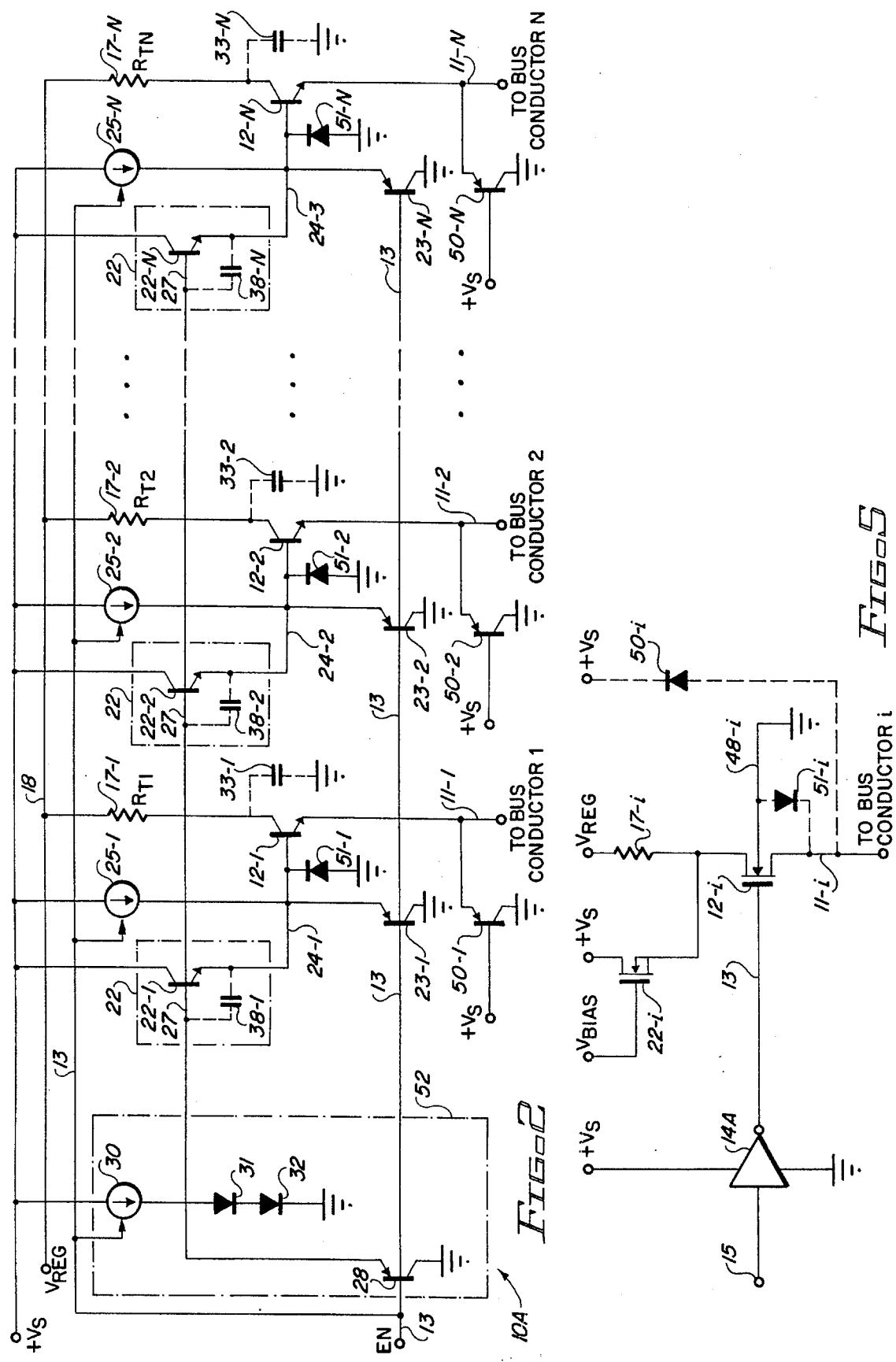

LOW CAPACITANCE ELECTRONICALLY CONTROLLED ACTIVE BUS TERMINATOR CIRCUIT AND METHOD

BACKGROUND OF THE INVENTION

The invention relates to electronically controlled active bus terminators that controllably connect termination resistors to and disconnect them from corresponding computer bus conductors, and more particularly to improved bus terminator circuitry that presents very low capacitance to the bus conductors when the termination resistors are electronically disconnected from the corresponding bus conductors.

U.S. Pat. No. 4,920,339 (Friend et al.) and U.S. Pat. No. 5,272,396 (Mammano et al.), the article "Push SCSI Performance to the Limit", by Paul Boulay et al., Electronic Design, May 10, 1990, pages 85–92, and the Texas Instruments application brief entitled "Single-Ended SCSI Termination Using the TL2218-285 Terminator (undated), are believed to generally indicate the state of the relevant art.

Many small computer systems are quite expandable. This means that various "add on" modules or printed circuit boards can be plugged into or electronically switched onto the computer bus, creating new "ends" of the bus. For example, many computer buses are "daisy chained" through a large number of plugged in modules. It is well known that computer bus conductors, such as SCSI (Small Computer Systems Interface) bus conductors, need to be terminated by corresponding termination resistors which match the characteristic impedance of the bus conductors to avoid undesired signal-degrading reflections at the ends of the bus conductors. Therefore it often is desirable to provide "bus terminators", or simply "terminators", in each module. Such terminators include termination resistors that can be connected under electronic control to each bus conductor or disconnected under electronic control from each bus conductor. This allows proper termination of the opposite ends of each bus conductor as the location of such ends change due to reconfiguration of the system by adding various modules and/or removing thereof from the SCSI bus.

A common configuration for SCSI bus terminations includes a 220 ohm resistor connected between a +4.25 volt power supply and a bus conductor, with a 330 ohm resistor connected between the bus conductor and ground. The Thevenin equivalent of this configuration is often implemented in integrated circuit form as a number of 110 ohm termination resistors each having a first terminal connected to a corresponding bus conductor terminal and a second terminal connected by a switch to a 2.85 volt voltage regulator output, as generally disclosed in the above mentioned Friend et al. and Mammano et al. patents. This Thevenin equivalent implementation is referred to as an "active" bus terminator. The switches are turned on in the terminators of the modules located at the ends of the SCSI bus, but in all of the other modules at intermediate locations of the SCSI bus, both the switches and the voltage regulator are turned off, electronically disconnecting the termination resistors from the corresponding bus conductors; this preserves the characteristic impedance of the bus and reduces system power dissipation.

The "active" terminator system disclosed in the Mammano et al. patent has been marketed by Unitrode Corporation as the UC5601 SCSI Active Terminator. A shortcoming of this device is that the capacitances of its output conductors are much higher than desirable when the electronically controlled active terminator is in its "turned off" or "disconnected" state.

FIG. 3 illustrates the internal connections of the UC5601 Active Terminator for one of 18 bus conductors individually and collectively referred to herein as BUS CONDUCTOR i, where i is 1,2 . . . 18, and wherein the termination resistor 17-i is actually implemented as a three-resistor, two-transistor "resistive network" as shown by numeral 98'in FIG. 4 of the Mammano et al. U.S. Pat. No. 5,272,396, issued Dec. 21, 1993, entitled "Controllable Bus Terminator With Voltage Regulator", and incorporated herein by reference. The resistive network 17-i (wherein the index i can have values of 1,2. . . N) has a large parasitic capacitance indicated by dotted lines 36 in FIG. 3 herein. Each of 18 NPN clamping transistors 37-i has its emitter connected to the corresponding bus line 11-i and its base connected to a common bias circuit output conductor 39, and has a base-to-emitter parasitic capacitance 38 as indicated by dotted lines. These two parasitic capacitances, which have a combined value of roughly 8 to 10 picofarads, permanently add to the capacitance of the SCSI Bus Conductor i connected to output terminal 17-i, regardless of the state of the NPN transistor switch 12-i. If a large number of modules each including a UC5601 active terminator are plugged into the SCSI bus, their total addition to the bus conductor capacitance is large, substantially reducing bandwidth of the bus.

Furthermore, since the i base-to-emitter capacitances 38 all are coupled to the same bias circuit output conductor 39, all of the bus conductors 11-i are capacitively coupled to each other, and a logic signal on any one of the bus conductors produces a noise signal on all of the others, increasing the likelihood of bus data errors.

In FIG. 3, the base of each clamping transistor 37-i is biased at one diode voltage above ground by the output conductor 39 of a bias circuit including diode 41 and a switched current source 40 controlled by the "disconnect" input signal of the UC5601. Clamping transistor 37-i operates to limit or prevent negative voltage "ringing" of SCSI Bus Conductor i (to which output terminal 11-i is connected), i.e., to prevent Bus Conductor i from swinging below ground. The physical size of NPN switch transistor 12-i is quite large, its "on" resistance being only about 10 ohms. Its large parasitic collector-to-substrate capacitance 35 and large emitter-base capacitance 34 are indicated by dotted lines.

Thus, the prior art structure shown in FIG. 3 presents a large output capacitance on each output terminal 11-i. If, for example, many such electronically controlled active terminators are plugged into the SCSI bus, with only the ones located at opposite ends of the bus being turned on, the "intermediate" electronically controlled active terminators all also add to the total bus conductor capacitance, and therefore "rob" current from the data signals, thereby corrupting the signal waveshapes and reducing the bus bandwidth.

Those skilled in the art will recognize that the switch transistors 12-i in the prior art circuit of FIG. 3 are very large devices which, when on, are in their fully saturated modes and therefore fall far short of being ideal switches. Their collector voltages are constant at $V_{REG}$, and since their saturation resistances are only about 10 ohms, nearly all of the voltage swings of Bus Conductors i appear across 110 ohm termination resistors 17-i. The emitter and base voltages of transistor switches 12-i therefore do not vary by more than roughly 300 millivolts when the SCSI bus conductors swing between logical "1"s and "0"s.

For these reasons, it was thought that it would be impractical to connect the transistor switches 12-i directly to the output terminals 11-i, as this would require the emitter-base voltages of switch transistors 12-i to swing through the approximately 3 volt range of the bus signals. It was thought that the large amount of stored charge and the parasitic collector-substrate capacitances associated with the switch transistors would rob enough current from the logic signals on Bus Conductors i to substantially degrade the rise times and fall times of data pulses on the SCSI Bus Conductors and thereby reduce bus bandwidth and system operating speed. Those skilled in the art recognize that the market is very concerned with achieving high operating speeds, and therefore low output capacitances for bus terminators are highly desired, even at the cost of relaxing other bus terminator specifications.

Upon information and belief, the only presently known approaches to reducing the "disabled" or "disconnected" mode output terminal capacitances of present electronically controlled active bus terminators have been to (1) add semiconductor manufacturing process steps to thicken the insulating oxides on which the thin film termination resistors (such as 17-i) are disposed to reduce the associated parasitic capacitances 36 (FIG. 3), and (2) to eliminate the clamping transistors such as 37-i so as to eliminate their parasitic capacitances 38. However, increasing the cost and complexity of manufacturing integrated circuit electronically controlled active terminators obviously is undesirable, and loss of the output terminal clamping function in some cases is undesirable.

U.S. Pat. No. 5,336,948 issued to Jordan on Aug. 9, 1994 discloses a circuit 44 in FIG. 3 thereof that includes the combination of an "active negation emulator" 34 and an active termination network 28, either of which can be connected to a bus conductor 12 by a single pole, triple throw switch 46. The active negation emulator circuit 34, when connected to bus conductor 12 by switch 46, senses whether the signal on bus conductor 12 is greater than a 1.2 volt mid-range threshold, and if it is, supplies an additional "boost" current into bus conductor 12 to aid it in reaching a "high" logic level of at least 2.8 volts. If switch 46 instead connects the bus conductor 12 to termination network 28, termination network 28 provides a matched transmission line termination into a 2.85 volt regulated voltage source so as to eliminate signal reflections at the end of the bus conductor 12.

The termination resistor R1 of the termination network 28 is connected between switch 46 and the output of the voltage regulator 32. This is a reversal of the connection shown in the above identified Mammano et al. patents, wherein the termination resistor is connected between the bus conductor and the switch, the switch being connected between the termination resistor and the output of the voltage regulator. The reversal of the position of switch 46 and termination resistor R1 relative to their positions in the Mammano et al. patents is forced by the need to position switch 46 so that either active negation emulator 34 or termination network 28 can be connected to bus conductor 12. When termination network 28 is disconnected and active negation emulator 34 is connected, the capacitances associated with the non-inverting input of comparator 52, resistor R3, diode D3, the emitter of transistor Q1, and the associated conductors all are added to the capacitance on the output port of the combination emulator/terminator circuit 44. Also, if single pole, triple throw switch 46 is implemented as an electronic switch, it would be constructed as a combination of three single pole, single throw switches with a common connection at node 48, which then would have a high capacitance. This high capacitance is undesirable for the reasons mentioned above. The desirability of minimizing the capacitance of the output terminal of the bus termination device when it is electronically disconnected from the bus conductor is not recognized in the Jordan patent.

Thus, there is a presently unmet need for an improved electronically controlled active terminator integrated circuit which presents low "off" or "disabled" mode output terminal capacitance without increasing semiconductor manufacturing process cost. There also is an unmet need for such an improved electronically controlled active terminator integrated circuit which does not eliminate the function of the output terminal clamping transistors of the prior art.

SUMMARY OF THE INVENTION

Accordingly, it is an object of the invention to improve the bandwidth of a SCSI bus having a large number of electronically controlled active terminators plugged into it.

It is another object of the invention to provide an improved electronically controlled active terminator circuit and method which produces reduced output terminal capacitances in an "off" or "disabled" mode without having to increase the thicknesses of oxides beneath the termination resistors.

It is another object of the invention to provide reduced output terminal capacitance during an "off" or "disabled" mode of an electronically controlled active terminator circuit having electrostatic discharge (ESD) protection devices.

It is another object of the invention to provide reduced output terminal capacitance during an "off" or "disabled" mode of an electronically controlled active terminator circuit having electrostatic discharge (ESD) protection devices, and especially one having ESD protection devices to absorb the energy of ESD discharges into the output terminals and ESD discharges from the output terminals.

It is another object of the invention to provide reduced output terminal capacitance during an "off" or "disabled" mode of an electronically controlled active terminator circuit while also providing a clamping function which limits voltage undershoot of an output terminal.

Briefly described, and in accordance with one embodiment thereof, the invention provides a low capacitance electronically controlled active bus line terminator circuit having a control terminal adapted to receive a control signal and a plurality of output terminals adapted for connection to a plurality of corresponding bus conductors. The terminator circuit includes a voltage regulator, a plurality of termination resistors and a plurality of switch transistors. A first terminal of each termination resistor is connected to an output of the voltage regulator. The collector of each switch transistor is connected to a second terminal of a corresponding termination resistor. The emitter of each switch transistor is connected to a corresponding output terminal. A control circuit includes an input connected to the control terminal and an output connected to the bases of the switch transistors to turn them on in response to a first level of the control signal. The control circuit turns the switch transistors off in response to a second level of the control signal, to thereby isolate the output terminals from parasitic capacitances associated with the termination resistors and the collectors of the switch transistors while the switch transistors are off.

In one described embodiment, a plurality of clamping transistors each have an emitter connected to the base or collector of a corresponding switch transistor and a base connected to a bias circuit to forward bias the base-emitter junctions of the clamping and the switch transistors to thereby limit negative voltage swings of the various bus conductors. A plurality of switchable current source circuits each have a current supplying terminal coupled to the emitter of a corresponding pulldown transistor and a control input coupled to turn on the current sources in response to the first level of the control signal. Each pulldown transistor has its base connected to the output of the control circuit to maintain the switch transistors off when the electronically controlled active bus line terminator is off. The bias circuit includes a PNP control transistor having an emitter connected to the bases of the clamping transistors, a base connected to the output of the control circuit, and a collector connected to the ground voltage conductor, to maintain the clamping transistors off when the electronically controlled active bus line terminator is off. The bias circuit includes a switchable current source connected between a power supply voltage and the bases of the clamping transistors and a pair of diodes connected in series between the bases of the clamping transistors and the ground voltage conductor. Each switchable current source circuit has a terminal connected to the power supply voltage, and is switched in response to the control signal. Several MOS field effect transistor embodiments of the invention also are disclosed. Low capacitance electrostatic protection devices are provided for absorbing energy of electrostatic discharges into the output terminals, and electrostatic protection devices for absorbing energy of electrostatic discharges out of the output terminals also are provided.

BRIEF DESCRIPTION OF THE DRAWINGS

FIG. 1 is a block diagram of the low capacitance electronically controlled active terminator circuit of the present invention.

FIG. 2 is a circuit schematic diagram illustrating a bipolar transistor circuit implementation of the system shown in FIG. 1.

FIG. 3 is a circuit diagram useful in describing the prior art.

FIG. 4 is a diagram of an alternative resistive network which can be used in place of the termination resistors of FIGS. 1, 2 and 2A.

FIG. 5 shows an alternative embodiment of the invention using field effect transistors.

DETAILED DESCRIPTION OF THE PREFERRED EMBODIMENTS

Figures 2A, 6:
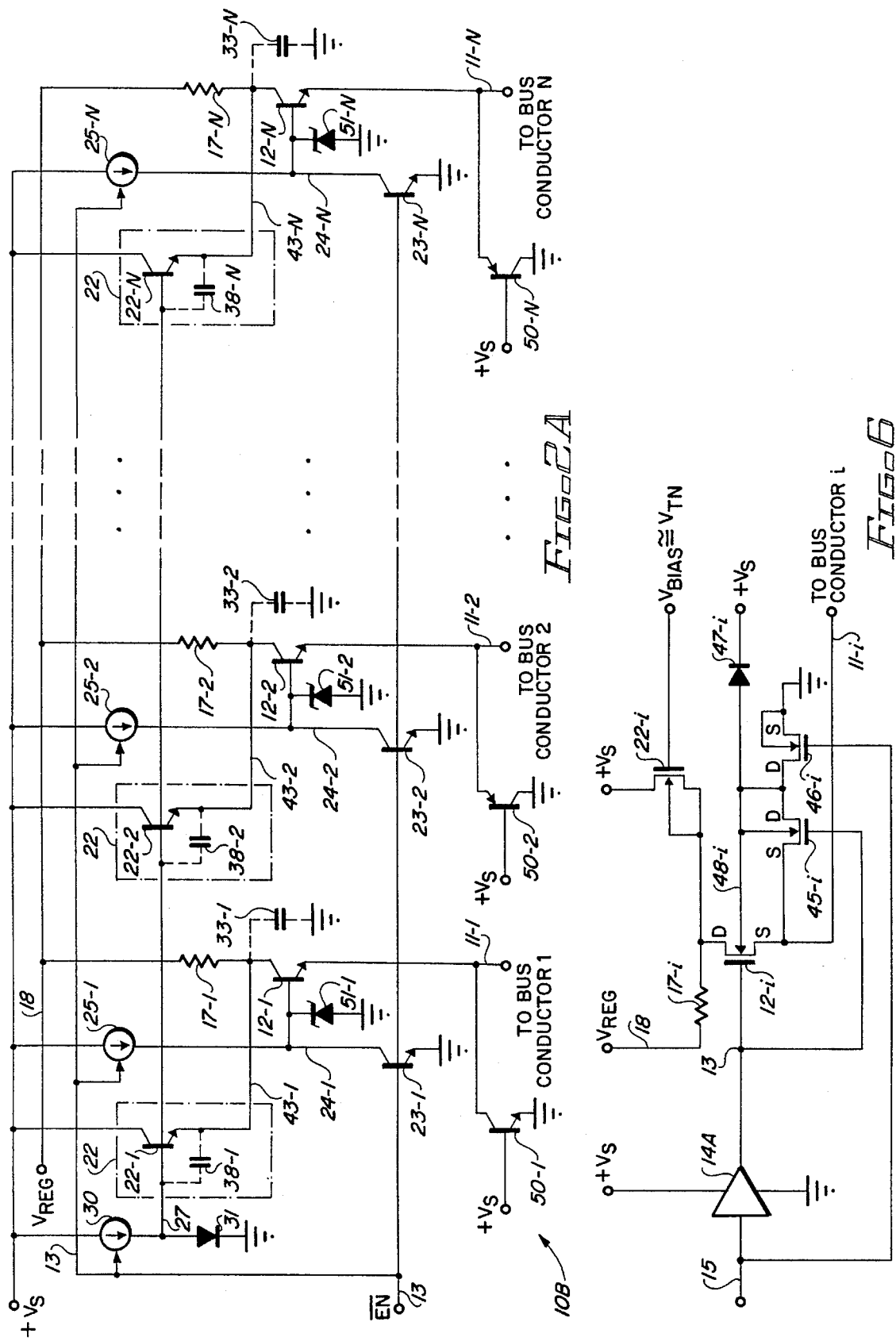
FIG. 2A is a circuit schematic diagram similar to FIG. 2, except that the clamping transistors are connected to the collectors, rather than the bases of the switch transistors.
FIG. 6 shows another alternative embodiment of the invention using field effect transistors.

Referring to FIG. 1, electronically controlled active terminator circuit 10, which is implemented in an integrated circuit, provides selective connection of output terminals 11-1,2 . . . N. Normally, terminator circuit 10 would be installed in an interface module plugged into a SCSI bus, so output terminals 11-1,2 . . . N would be connected to Bus Conductors 1,2 . . . N, respectively, of a SCSI bus. Output terminals 11-1,2 . . . N are connected to a first terminal of each of switches 12-1,2 . . . N, respectively. The control terminals of switches 12-1,2 . . . N respond to the output 13 of a control circuit 14, which supplies turn on and turn off signals for the switches 12-1,2 . . . N and voltage regulator 19.

Control circuit 14 responds to a control signal 15 to turn electronically controlled active terminator circuit 10 on or off. A second terminal of each of switches 12-1,2 . . . N is connected by conductors 16-1,2 . . . N to a first terminal of each of termination resistors 17-1,2 . . . N, respectively.

By way of definition, the first and second terminals of each switch 12 are considered to be "current-carrying terminals", meaning that when the switch is closed, a current easily flows through a low "on" resistance from one of the first and second terminals to the other. The collector and emitter of a bipolar transistor are examples of what is meant by "current-carrying terminals" as are the source and drain of a field effect transistor. Preferably, the "current-carrying terminal " connected permanently to the bus conductor is the terminal configured to have the lower capacitance when the switch is turned off.

Termination resistors 17-1,2 . . . N preferably are thin film resistors, such as nichrome resistors which can be laser trimmed precisely to their desired values and have a resistance temperature coefficient of nearly zero. Conductors 16-1,2 . . . N can be connected to outputs of clamp circuits 22-1,2 . . . N, respectively. A second terminal of each of termination resistors 17-1,2 . . . N is connected by conductor 18 to the output voltage $V_{REG}$ of a 2.85 volt voltage regulator 19. Voltage regulator 19 is connected between power supply voltage $V_s$ and ground. Voltage regulator 19 may have a control input connected to conductor 13 to turn off voltage regulator 19 while switches 12-1,2 . . . N are open, to thereby reduce the total power consumption of electronically controlled active terminator circuit 10.

Optional clamp circuits 22 are biased on by optional bias circuit 20 to prevent negative excursions of Bus Conductors 1,2 . . . N below ground. Bias circuit 20 has a control input connected to conductor 13 to disable bias circuit 20 while switches 12-1,2 . . . N are open. Switches 12-1,2 . . . N are closed when electronically controlled active terminator circuit 10 is turned on, and Bus Conductors 1,2 . . . N are terminated to the 2.85 volt value of $V_{REG}$ by termination resistors 17-1,2 . . . N, respectively, all of which have a termination resistance $R_T$ of 110 ohms.

By comparing the positions of switches 12-1,2 . . . N with termination resistors 17-1,2 . . . N in FIG. 1 with the prior art indicated in FIG. 3, it can be seen that termination resistors 17-1,2 . . . N are not permanently connected to output terminals 11-1,2 . . . N as in the prior art (FIG. 3), but instead are permanently connected to voltage regulator output conductor 18. Furthermore, the switches 12-1,2 . . . N, rather than the termination resistors, are permanently connected to output terminals 11-1,2 . . . N. The anti-ringing clamping devices 22 are not directly connected to the output terminals as in the prior art shown in FIG. 3. Instead, in FIG. 1 clamping circuits 22 are coupled to output terminals 11-1,2 . . . N only when switches 12-1,2 . . . N are closed.

FIG. 2 shows a specific implementation 10A of the controllable low capacitance electronically controlled active terminator circuit of FIG. 1. Switches 12-1,2 . . . N include NPN switch transistors 12-1,2 . . . N each having its emitter connected to the corresponding output terminal 11-1,2 . . . N, shown along the bottom of FIG. 2. The collectors of switch transistors 12-1,2 . . . N are connected to the lower terminals of the corresponding termination resistors 17-1,2 . . . N, respectively. The various optional clamp circuits 22 include NPN clamp transistors 22-1,2 . . . N, respectively. The base of switch transistor 12-1 is connected by conductor 24-1 to switchable current source 25-1, the emitter of clamp transistor 22-1, and the emitter of PNP pulldown transistor 23-1.

The base of switch transistor 12-2 is connected by conductor 24-2 to switchable current source 25-2, the emitter of clamp transistor 22-2, and the emitter of PNP pulldown transistor 23-2. The bases of the switch transistors 12-3 . . . N are similarly connected to corresponding switchable current sources, clamping transistors, and pulldown transistors.

The PNP pulldown transistors 23-1,2 . . . N and the switchable current sources 25-1,2 . . . N can be considered to be part of the control circuit 14 of FIG. 1, wherein control circuit 14 is illustrated merely as a buffer.

Similarly to the circuit in FIG. 1, the upper terminals of termination resistors 17-1,2 . . . N FIG. 2 are connected to $V_{REG}$ conductor 18. The upper terminals of controllable current sources 25-1,2 . . . N and the collectors of optional NPN clamping transistors 22-1,2 . . . N are connected to $+V_s$. The collectors of pulldown PNP transistors 23-1,2 . . . N are connected to ground and their bases are connected to EN conductor 13. An enable signal EN is produced on conductor 13 by control circuit 14 of FIG. 1. The bases of optional NPN clamp transistors 22-1,2 . . . N are connected by conductor 27 to the output of an optional bias circuit 52. The bias circuit 52 includes switchable current source 30 connected between $+V_s$ and conductor 27, and also includes diodes 31 and 32 which are connected in series between conductor 27 and ground. Conductor 27 also is connected to the emitter of PNP pulldown transistor 28, the base of which is connected to EN conductor 13 and the collector of which is connected to ground. The control terminals of switchable current sources 30 and 25-1,2 . . . N are connected to conductor 13. Parasitic capacitances 33-1,2 . . . N include the collector-substrate capacitances of switch transistors 12-1,2 . . . N "lumped" together with the parasitic capacitances associated with termination resistors 17-1,2 . . . N.

ESD (electrostatic discharge) protection devices normally are connected to the terminals of almost any integrated circuit. In FIG. 2, PNP "substrate" transistors 50-1,2 . . . N function as ESD devices and have their bases connected to the low impedance $+V_s$ conductor and their collectors connected to the ground conductor. Their emitters are connected to output conductors 11-1,2 . . . N, respectively. ESD PNP transistors 50-1,2 . . . N absorb energy impulses resulting from electrostatic discharge into terminals 11-1,2 . . . N to prevent damage to the internal circuitry of bus terminator 10A. These ESD protection devices 5-1,2 . . . N have quite small emitters, and therefore parasitic emitter-to-base capacitance. In operation there is also 1.5 volts to over 4 volts reverse bias on these emitters, which further reduces their emitter-base capacitances. Thus, these ESD devices 50-1,2 . . . N do not add much to the capacitance of output terminals 11-1,2 . . . N. Diodes 51-1,2 . . . N have their cathodes connected to the bases of switch transistors 12-1,2 . . . N, respectively, and have their anodes connected to the ground conductor. These diodes function as ESD protection devices to absorb energy resulting from electrostatic discharges out of output terminals 11-1,2 . . . N, respectively. The capacitance of each of ESD protection diodes 51-1,2 . . . N is about lb 3to 10 times greater than the emitter-to-base capacitance of ESD protection transistors 50-1,2 . . . N, but this matters little, since the former are isolated from the output terminals when the transistor switches 12-1,2 . . . N are off. The low impedance of the supply voltage conductors carrying $+V_s$ and ground voltage prevents any appreciable capacitive signal coupling between bus conductors through the PNP electrostatic protection transistors 50-1,2 . . . N on the ESD protection diodes 51-1,2 . . . N.

If terminator circuit 10A is to be electrically connected to Bus Conductors 1,2 . . . N, the signal EN on conductor 13 is set to a "high" level. This turns off PNP pulldown transistors 28 and 23-1,2 . . . N, and also turns switchable current sources 30 and 25-1,2 . . . N on. Conductor 27 therefore is biased at two diode drops above ground.

Current source 25-1 therefore supplies current into the base of switch transistor 12-1, saturating it and thereby terminating Bus Conductor 1 to $V_{REG}$ through termination resistor 17-1. Bus Conductors 2,3 . . . N are similarly terminated to $V_{REG}$ through termination resistors 17-2,3 . . . N, respectively. The voltage on conductor 24-1 "tracks" with logical "1" and "0" voltage levels which appear on Bus Conductor 1, and if Bus Conductor 1 attempts to "ring" below ground, the emitter-base junction of clamp transistor 22-1 becomes forward biased, limiting or preventing the negative excursion (since switch transistor 12-1 is already on). Clamp transistors 22-2,3 . . . N similarly limit negative-going excursions of Bus Conductors 2,3 . . . N to approximately zero volts.

If terminator circuit 10A is not located at an end of the SCSI bus, and therefore is to be turned off, EN is set to a "low" level, near ground. This turns on PNP pulldown transistors 28 and 23-1,2 . . . N and also turns off switchable current sources 30 and 25-1,2 . . . N, pulling the bases of NPN switch transistors 12-1,23 . . . N to a $V_{BE}$ level above ground. This turns them off and thereby electrically isolates output terminals 11-1,2 . . . N and Bus Conductors 1,2 . . . N from termination resistors 17-1,2 . . . N, and in accordance with the invention, also isolates output terminals 11-1,2 . . . N and Bus Conductors 1,2 . . . N from parasitic capacitances 33-1,2 . . . N associated with the collectors of transistor switches 12-1,2 . . . N and parasitic capacitances 38-1,2 . . . N associated with optional clamp transistors 22-1,2 . . . N. Clamping transistors 22-1,2 . . . N do not perform a clamping function that limit voltage undershoot on the output terminals 11-1,2 . . . N during the "off" state of electronically controlled active termination circuit 10A.

Thus, terminator circuit 10A presents low output capacitance on its output terminals 11-1,2 . . . N during its "off" or "disabled" or "disconnected" state isolating the termination resistor parasitic capacitances (such as parasitic capacitance 36 of FIG. 3) and also isolating any parasitic capacitances of the clamping transistors 22-1,2 . . . N when the electronically controlled active terminator circuit 10A is turned off.

Computer simulations comparing performance of an electronically controlled active terminator circuit as in FIG. 2 to the prior art circuit of FIG. 3 indicate that the output capacitance for the circuit of FIG. 2 may be as low as 3–5 picofarads, compared to approximately 10 picofarads for the prior art approach of FIG. 3. (Such computer simulations were made on the basis of the same circuit element sizes and the same manufacturing technology parameters for each circuit). The low value of output capacitance is achieved without complicating the semiconductor manufacturing process to increase oxide thickness under the terminating resistors, and clamping of the bus conductors to limit or prevent undershoot thereof is achieved when the electronically controlled active terminator 10A is turned on without clamping transistors being directly connected to the output terminals.

The above mentioned computer simulations indicate that even though all (rather than only ten percent) of the 3 volt logic swings appearing on Bus Conductors 1,2 . . . N also appear on the emitters, bases, and collectors of switch transistors 12-1,2 . . . N when they are turned on, the stored charge and parasitic capacitances associated with the switch transistors 12-1,2 . . . N and termination resistors 17-1,2 . . . N in the configuration of FIG. 2 does not appreciably degrade the pulse signals on Bus Conductors 1,2 . . . N. Apparently, and surprisingly, the 110 ohm termination resistors used in the computer simulation effectively dampen out most or all of the stored charge and parasitic capacitance effects of the saturated switch transistors, and even appear to result in slightly "cleaner" waveforms that would be associated with more effectively terminated bus conductors.

FIG. 2A shows terminator 10B which is a variation of terminator 10A of FIG. 2. In FIG. 2A, the emitters of clamp transistors 22-1,2 . . . N are connected to the collectors, rather than the bases of switch transistors 12-1,2 . . . N, respectively, so their associated parasitic capacitances 38-1,2 . . . N are completely isolated from the output terminals when transistor switches 12-1,2 . . . N are off. The bias circuit needs only one diode 31, since the $V_{BE}$ drops of the switch transistors 12-1,2 . . . N have been eliminated from the clamping paths between conductor 27 and Bus Conductors 1,2 . . . N. For the embodiment of FIG. 2A, the PNP pulldown transistor 28 is not needed because no clamping can occur through the collectors of switch transistors 12-1,2 . . . N if they are turned off. The ESD protection devices are the same as in FIG. 2. Computer simulations of the operation of the embodiment of FIG. 2A also have been performed, with results essentially the same as for the embodiment of FIG. 2.

The embodiments of the invention shown in FIGS. 2 and 2A provide the advantage of low output terminal capacitance for the bus terminator circuits 10A and 10B in combination with economical, effective ESD protection from ESD discharges both into and out of the output terminator, avoidance of capacitive signal coupling between output terminals, and also allow the option of providing clamp transistors, if desired, which do not substantially increase the output terminal capacitances when the bus terminator is in its disconnected mode.

It should be understood that the technique shown in FIGS. 1 and 2 is equally applicable if a resistor-transistor "resistive network" similar to that shown in FIG. 4 of the Mammano et al. patent are used to replace the individual termination resistors 17-1,2 . . . N. It is to be understood that the term "termination resistor" as used herein is intended to encompass a "resistive network" similar to that shown in FIG. 4 of the Mammano et al. patent.

FIG. 4 herein illustrates such a resistive network 54-i, in which NPN switch transistor 12-i' and a relatively high resistance trim resistor 17-i' are connected in parallel with termination resistor 17-i. Additional trim resistors such as 17-i" and corresponding switch transistors such as 12-i" also can be similarly connected, with zener diodes as illustrated being "blown out" during manufacturing as desired to effectively disconnect the corresponding trim resistors 17-i' and/or 17-i". The trim resistors and transistors and zener diodes and their parasitic capacitances preferably are arranged so as to be isolated from the output terminals 11-i by the corresponding switch transistors whenever the electronically controlled active terminator is turned off.

It also should be appreciated that the switches 12-1,2 . . . N in FIG. 1 could be MOS field effect transistors (MOSFETs). In this case, the clamping function shown in FIG. 2 would not then be achievable, but the clamping function could be achieved through the drains of MOS field effect transistors in a manner analogous to that shown in FIG. 2A.

FIG. 5 shows the portion of a MOSFET implementation of the low capacitance electronically controlled active terminator of the present invention that controllably terminates a Bus Conductor i of a SCSI bus. Switch 12-i is an N channel MOSFET having its gate connected by conductor 13 to the output of inverter 14A. In this circuit, the source and drain of switch MOSFET 12-i are formed in a P-type substrate which constitutes the "body" electrode 48-i of switch MOSFET 12-i. An optional clamping N-channel MOSFET 22-i has its drain connected to $+V_s$, its source connected to the collector of MOSFET switch 12-i, and its gate connected to a bias voltage $V_{BIAS}$ which is equal to the sum of the threshold voltage $V_{TN}$ of clamp MOSFET 22-i and the source-to-drain voltage $V_{DS}$ of MOSFET switch 12-i. The n-type source-to-p-well diode 51-i functions as an EDS protection device for ESD discharges out of output terminal 11-i, and an ESD diode 50-i with its anode connected to output terminal 11-i and its cathode connected to $V_s$ provides ESD protection from ESD discharge into output terminal 11-i.

The capacitance of a disable switch is only the source-to-body parasitic capacitance and very small source-to-gate overlay capacitance. The normal source-to-body short circuit connection typically used in NMOS switches fabricated in p-wells formed in n-type substrates has been disconnected to remove the large p-well-to-substrate capacitance from the output terminal.

FIG. 6 shows the portion of another MOSFET implementation of the low capacitance electronically controlled active terminator of the present invention that controllably terminates Bus Conductor i. The switch 12-i is an N channel MOSFET having its gate connected by conductor 13 to the output of inverter 14A. In this circuit configuration, the source and drain of switch MOSFET 12-i are formed in a P-type well region that is formed in an N-type substrate. The P-type well region constitutes the "body" electrode 48-i of switch MOSFET 12-i. When conductor 15 is at a high level, switch MOSFET 12-i is off, isolating output terminal 11-i from termination resistor 17-i and the parasitic capacitances associated with it and also isolating output terminal 11-i from the drain and the P-well-to-substrate capacitance of MOSFET 12-i. When switch MOSFET 12-i is off, its P-type body or "well" region 48-i, which is the anode of P-well-to-substrate diode 47-i, is electrically connected to ground by N channel MOSFET 46-i, and MOSFET 45-i is off.

This avoids the large capacitance of the P-well-to-substrate diode 47-i from appearing on output terminal 11-i when switch MOSFET 12-i is off. When switch MOSFET 12-i is on, its P-well 48-i is connected to its source, and hence to output terminal 11-i. The output capacitance of this turned off electronically controlled active terminator therefore is quite small, as it includes only the source-to-body and the source-to-gate capacitances of switch MOSFET 12-i. If a P channel switch is used, its body electrode is connected to $+V_s$ and therefore has no effect on the output terminal capacitance; however a large-magnitude negative gate voltage would be required; such gate voltage would be very inconvenient to generate.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. An electronically controlled active bus termination circuit including a voltage regulator, a plurality of termination resistors each having a first terminal and a second terminal, a plurality of corresponding transistor switches each having a control terminal and first and second current-carrying terminals, control circuitry having an input adapted to receive a control signal and outputs connected to control the control terminals of the transistor switches to turn on the transistor switches in response to a first level of the control signal and to turn off the transistor switches in response to a second level of the control signal, the improvement comprising in combination:

(a) a conductor connecting an output terminal of the voltage regulator to the first terminals of the termination resistors;

(b) a plurality of conductors connecting the first current-carrying terminal of each of the transistor switches to the second terminal of each of the termination resistors, respectively, each transistor switch having no current-carrying terminals other than the first and second current-carrying terminals; and (c) a plurality of conductors connecting the second current-carrying terminal of each of the transistor switches to a plurality of output terminals, respectively, of the electronically controlled active bus termination circuit, the output terminals being adapted for connection to a plurality of corresponding bus conductors, respectively, of a computer bus, wherein no electronic elements of the electronically controlled active bus termination circuit other than the transistor switches and electrostatic discharge protection devices are connected to the various output terminals of the electronically controlled active bus termination circuit.

2. An electronically controlled active bus termination circuit including a voltage regulator, a plurality of termination resistors each having a first terminal and a second terminal, a plurality of corresponding transistor switches each having a control terminal and first and second current-carrying terminals, control circuitry having an input adapted to receive a control signal and outputs connected to control the control terminals of the transistor switches to turn on the transistor switches in response to a first level of the control signal and to turn off the transistor switches in response to a second level of the control signal, the improvement comprising in combination:

(a) a conductor connecting an output terminal of the voltage regulator to the first terminals of the termination resistors;

(b) a plurality of conductors connecting the first current-carrying terminal of each of the transistor switches to the second terminal of each of the termination resistors, respectively, each transistor switch having no current-carrying terminals other than the first and second current-carrying terminals;

(c) a plurality of conductors connecting the second current-carrying terminal of each of the transistor switches to a plurality of output terminals, respectively, of the electronically controlled active bus termination circuit, the output terminals being adapted for connection to a plurality of corresponding bus conductors, respectively, of a computer bus; and (d) a plurality of clamping transistors each having an emitter connected to the first current-carrying terminal of one of the transistor switches, respectively, the clamping transistors each having a base, the electronically controlled active bus terminator also including a bias circuit applying a bias voltage to the bases of the clamping transistors to thereby forward bias the clamping transistors to limit voltage swings of the various bus conductors.

3. An electronically controlled active bus termination circuit including a voltage regulator, a plurality of termination resistors each having a first terminal and a second terminal, a plurality of corresponding transistor switches each having a control terminal and first and second current-carrying terminals, control circuitry having an input adapted to receive a control signal and outputs connected to control the control terminals of the transistor switches to turn on the transistor switches in response to a first level of the control signal and to turn off the transistor switches in response to a second level of the control signal, the improvement comprising in combination:

(a) a conductor connecting an output terminal of the voltage regulator to the first terminals of the termination resistors;

(b) a plurality of conductors connecting the first current-carrying terminal of each of the transistor switches to the second terminal of each of the termination resistors, respectively, each transistor switch having no current-carrying terminals other than the first and second current-carrying terminals;

(c) a plurality of conductors connecting the second current-carrying terminal of each of the transistor switches to a plurality of output terminals, respectively, of the electronically controlled active bus termination circuit, the output terminals being adapted for connection to a plurality of corresponding bus conductors, respectively, of a computer bus; and (d) a plurality of clamping transistors each having an emitter connected to the control terminal of one of the transistor switches, respectively, the clamping transistors each having a base, the electronically controlled active bus termination circuit also including a bias circuit applying a bias voltage to the bases of the clamping transistors to thereby forward bias the clamping transistors to limit voltage swings of the various bus conductors.

4. The electronically controlled active bus termination circuit of claim 1 wherein each transistor switch includes an NPN transistor having an emitter connected to the second current-carrying terminal of that transistor switch and a collector connected to the first current-carrying terminal of that transistor switch, the electronically controlled active bus termination circuit further including a plurality of PNP pulldown transistors each having an emitter connected to the base of one of the NPN transistors, respectively, a collector connected to a first reference voltage conductor, and a base connected to a corresponding output of the control circuit.

5. The electronically controlled active bus termination circuit of claim 4 including a plurality of switchable current source circuits each having a current supplying terminal coupled to the emitter of one of the PNP pulldown transistors, respectively, and each having a control input coupled to respond to the control circuitry outputs to turn on the plurality of switchable current sources in response to the first level of the control signal.

6. The electronically controlled active bus termination circuit of claim 3 wherein the bias circuit includes a PNP pulldown transistor having an emitter connected to the bases of the clamping transistors, a base connected to the output of the control circuit, and a collector connected to a first reference voltage conductor, to maintain the clamping transistors off when the electronically controlled active bus termination circuit is turned off.

7. The electronically controlled active bus terminator of claim 6 wherein the bias circuit includes a switchable current source circuit connected between a second reference voltage conductor and the bases of the clamping transistors, and a pair of diodes connected in series between the bases of the clamping transistors and the first reference voltage conductor.

8. The electronically controlled active bus terminator of claim 5 wherein each of the plurality of switchable current source circuits has a terminal connected to a reference voltage conductor.

9. The electronically controlled active bus termination circuit of claim 1 wherein each transistor switch includes a field effect transistor having one of its source and drain electrodes connected to the second current-carrying terminal of that transistor switch and the other of its source and drain electrodes connected to the first current-carrying terminal of that transistor switch.

10. A method of providing reduced capacitances on a plurality of output terminals of an electronically controlled active bus termination circuit during a disconnected state thereof, the electronically controlled active bus termination circuit including a voltage regulator and a plurality of termination resistors each having a first terminal and a second terminal, the method comprising the steps of:

(a) providing a plurality of electrically controllable switches, each having a control terminal, and each having only first and second current-carrying terminals;

(b) applying an output voltage level of an output terminal of the voltage regulator to the first terminals of the termination resistors;

(c) providing a connection between the second terminal of each termination resistor and the first current-carrying terminal of a corresponding one of the electrically controllable switches, respectively, and also providing a connection between the second current-carrying terminal of each electrically controllable switch and a corresponding one of the output terminals, respectively;

(d) electrically connecting the second terminals of the termination resistors to the output terminals, respectively, by closing the switches in response to a first level of the control signal; and (e) electrically disconnecting the second terminals of the termination resistors from the output terminals, respectively, by opening the switches in response to a second level of the control signal, thereby electrically isolating the output terminals from parasitic capacitances associated with the termination resistors, respectively, wherein the voltage regulator can be turned on, and can be turned off the reduce its power consumption, and wherein step (d) includes turning the voltage regulator on in response to the first level, and wherein step (e) includes turning the voltage regulator off in response to the second level.

11. A method of providing reduced capacitances on a plurality of output terminals of an electronically controlled active bus termination circuit during a disconnected state thereof, the electronically controlled active bus termination circuit including a voltage regulator and a plurality of termination resistors each having first terminal and a second terminal, the method comprising the steps of:

(a) providing a plurality of electrically controllable switches, each having a control terminal, and each having only first and second current-carrying terminals;

(b) applying an output voltage level of an output terminal of the voltage regulator to the first terminals of the termination resistors;

(c) providing a connection between the second terminal of each termination resistor and the first current-carrying terminal of a corresponding one of the electrically controllable switches, respectively, and also providing a connection between the second current-carrying terminal of each electrically controllable switch and a corresponding one of the output terminals, respectively;

(d) electrically connecting the second terminals of the termination resistors to the output terminals, respectively, by closing the switches in response to a first level of the control signal;

(e) electrically disconnecting the second terminals of the termination resistors from the output terminals, respectively, by opening the switches in response to a second level of the control signal, thereby electrically isolating the output terminals from parasitic capacitances associated with the termination resistors, respectively; and (f) operating a plurality of voltage clamping switches to clamp the second terminals of the termination resistors, respectively, prevent voltages of the second terminals of the termination resistors, respectively, from going substantially lower than a predetermined reference voltage level to thereby prevent the voltages of the output terminals, respectively, from going substantially lower than the predetermined reference voltage level while the electrically controllable switches are closed and to electrically isolate the output terminals from parasitic capacitances associated with the voltage clamping switches, respectively, while the electrically controllable switches are open.

12. An electronically controlled active bus termination circuit including a voltage regulator, a plurality of termination resistors each having a first terminal and a second terminal, a plurality of corresponding transistor switches each having a base, an emitter, and a collector, control circuitry having an input adapted to receive a control signal and outputs connected to control the bases of the transistor switches to turn on the transistor switches in response to a first level of the control signal and to turn off the transistor switches in response to a second level of the control signal, the improvement comprising in combination:

(a) a conductor connecting an output terminal of the voltage regulator to the first terminals of the termination resistors; p1 (b) a plurality of conductors connecting the first collector of each of the transistor switches to the second terminal of each of the termination resistors, respectively;

(c) a plurality of conductors connecting the emitter of each of the transistor switches to a plurality of output terminals, respectively, of the electronically controlled active bus termination circuit, the output terminals being adapted for connection to a plurality of corresponding bus conductors, respectively, of a computer bus;

(d) a first group of electrostatic protection devices connected to the output terminals, respectively, each of the electrostatic protection devices of the first group including a PNP transistor having an emitter connected to a corresponding output terminal, a base connected to a first reference voltage conductor, and a collector connected to a second reference voltage conductor; and (e) a second group of electrostatic protection devices connected to the bases each of the transistor switches, respectively, each of the electrostatic protection devices of the second group including a diode having an anode connected to the base of a corresponding transistor switch and a cathode connected to the second reference voltage conductor.

13. A method of providing reduced capacitances on a plurality of output terminals of an electronically controlled active bus termination circuit during a disconnected state thereof, the electronically controlled active bus termination circuit including a voltage regulator and a plurality of termination resistors each having a first terminal and a second terminal, the method comprising the steps of:

(a) providing a plurality of NPN transistor switches, each having a base, emitter, and collector;

(b) applying an output voltage level of an output terminal of the voltage regulator to the first terminals of the termination resistors;

(c) providing a connection between the second terminal of each termination resistor and the collector of a corresponding one of the transistor switches, respectively, and also providing a connection between the emitter of each transistor switch and a corresponding one of the output terminals, respectively;

(d) connecting the emitters of a plurality of PNP electrostatic protection devices to the plurality of output terminals, respectively, and connecting the bases of the PNP electrostatic protection devices to a first reference voltage conductor, and connecting the collectors of the plurality of PNP electrostatic protection devices to a second reference voltage conductor;

(e) connecting a plurality of cathodes of a plurality of electrostatic protection diodes to the bases of the transistor switches, respectively, and connecting the anodes of the electrostatic protection diodes to the second reference voltage conductor;

(f) electrically connecting the second terminals of the termination resistors to the output terminals, respectively, by turning the transistor switches on in response to a first level of a control signal; and (g) electrically disconnecting the second terminals of the termination resistors from the output terminals, respectively, by turning the transistor switches off in response to a second level of the control signal, thereby electrically isolating the output terminals from parasitic capacitances associated with the termination resistors, respectively, and the electrostatic protection diodes, respectively.

* * * * *